Patented Feb. 17, 1942

2,273,367

UNITED STATES PATENT OFFICE 2,273,367

INSULATING MATERIAL AND METHOD OF MANUFACTURE

Leonard S. Meyer, Toledo, Ohio, assignor to Plaskon Company, Incorporated, Toledo, Ohio, a corporation of Delaware No Drawing. Application August 3, 1938, Serial No. 222,759

5 Claims. (Cl. 18—48)

The invention relates to the manufacture of insulating material, and is an improvement upon the invention of U. S. Patent No. 2,076,295. That patent describes an insulating material consisting of formaldehyde-urea resin foam.

A material having excellent insulating properties can be produced by whipping an aqueous solution of a formaldehyde-urea reaction product containing a foaming agent and a hardening agent into a foam and then allowing the foam to gel or harden. A comminuted fibrous filler, such as wood flour or other cellulosic material, is preferably added to the formaldehyde-urea solution before it is foamed.

When wood flour is used as a filler, the foaming should be sufficient so that the specific gravity of the hardened foam when dried is from about .02 to about .05. If the specific gravity of the dried formaldehyde-urea resin foam is less than about .02, the material is too fragile. If, on the other hand, the specific gravity of the product is more than about .05, it is not stable, and gradually disintegrates by cracking. The specific gravity of an insulating material containing no fibrous filler must be even less than .05 to prevent cracking.

The maximum concentration of the formaldehyde-urea solution that can be used is about 45 per cent. More concentrated solutions are so viscous that they cannot be foamed to a sufficiently low specific gravity. If a fibrous filler is to be employed, the concentration of the formaldehyde-urea solution must be below 45 per cent, and the proportion of fibrous filler must be low enough so that the slurry is not too viscous to permit foaming to a dry specific gravity of about .05 or less.

The amount of foaming agent employed is simply an amount sufficient to produce a foam of the required low specific gravity. The hardening agent is simply an acid substance that causes the water-soluble formaldehyde-urea reaction product to be converted into a hard insoluble resin. After a formaldehyde-urea solution has been foamed, the foam immediately begins to collapse, so that it is necessary to use enough hardening agent to gel or harden the foam before it collapses, and while it still has the desired low specific gravity.

The chief disadvantage of the foams heretofore prepared from formaldehyde-urea solutions has been their instability. The foams have been so unstable that they began to collapse immediately after being formed. Thus it has been necessary to use a sufficient quantity of acid so that the foams began to harden the moment they were formed. As a result, it has been necessary to cast the foam in the same receptacle in which it was whipped. Foams containing a low enough acid content to permit them to be cast in molds or otherwise shaped before hardening or setting have been found to collapse in the meantime to an undesirably high specific gravity. The insulating material of high specific gravity so produced has been lacking in durability.

The principal object of the invention is the preparation of durable insulating material by methods that are convenient for commercial application. More specific objects and advantages are apparent from the description, which merely discloses and illustrates the invention and is not intended to impose limitations upon the claims.

It has now been discovered that the foam remains stable for about 15 minutes if a calcium sulfate, preferably a hydrate of calcium sulfate such as plaster of Paris or gypsum, is added to the formaldehyde-urea solution before it is foamed. Egg albumen has an action similar to that of plaster of Paris or gypsum, but is less effective. The stabilization of the foam for a period of fifteen minutes is highly advantageous, because it makes it possible to transfer the foam from the whipping receptacle and to shape it in any desired manner before the hardening or setting takes place.

When plaster of Paris or gypsum is employed in the foam, the quantity of acid hardening agent should be small enough so that the foam does not become hard until the end of the fifteen-minute period. The small acid content of the final insulating material produced in accordance with the present invention as compared with the acid content of prior insulating materials has the effect of making the physical properties of the present material superior.

During the fifteen-minute period before the foam hardens, it may be supplied under a suitable pressure to an extrusion chamber, and extruded through a slot. If the foam is supplied continuously to the extrusion chamber, the sheet of insulating material extruded through the slot is continuous. In order to carry the continuous sheet of insulating material through a suitable drying chamber, a traveling belt may be provided that receives the sheet as it is extruded from the slot. It should be noted that prior foams collapsed so quickly that they had to be hardened immediately upon being formed. Thus it was not possible heretofore to extrude a formaldehyde-urea foam, and extrusion was made possible for the first time by the finely divided stabilizing agent of the present invention. Because of the fact that a foam prepared in accordance with the invention is stable for about 15 minutes, it may be cast in any desired form. For example, the foam may be cast in the proper shapes to fit an automobile top, an airplane fuselage or any other structure.

A formaldehyde-urea resin foam is an excellent insulator, but it is inherently of low physical strength. Thus it is likely to be broken up during shipment. A remarkable strengthening effect can be produced in accordance with the invention, however, if each block of formaldehyde-urea resin foam is provided with a stretchable coating that yields when the body is fractured, and then holds the body together. A block of foam provided with such a coating can be fractured by bending, or crushed, without disintegration, because the coating stretches during the breaking or crushing and then snaps back into shape, so that the block of insulation is crushed or fractured only in the interior and is kept quite intact by the stretchable coating. A block of insulating material provided with a stretchable coating has of course a much higher tensile and shearing strength, and is more resistant to abrasion than an uncoated block of hardened foam. The preferred stretchable coating materials are rubber and rubber substitutes. The coating may be formed by applying a solution of natural rubber or artificial rubber, but the preferred liquid for coating the insulating material is latex.

In the preparation of a foamable aqueous solution of a formaldehyde-urea reaction product, it is usually desirable to carry the formaldehyde-urea reaction as far as it can be carried without precipitation. A suitable solution of a formaldehyde-urea reaction product may be prepared as follows: Urea and formaldehyde in a molar ratio of 1:2 are gently refluxed in an aqueous solution that has been brought to pH 4.5-5.0 by means of sodium hydroxide. After the refluxing has been continued long enough (about 1 hour) to carry the formaldehyde-urea reaction to the desired stage, the solution is neutralized. The resulting solution can be diluted to a concentration of about 20 per cent. Further dilution causes precipitation of the reaction product.

*Example*

Crude butylated naphthalene sulfonic acid is first charged into the whipping apparatus, together with a small amount of water. This crude product contains a considerable amount of sulfuric acid, and its acidity depends upon the degree to which it has been purified. The quantity of butylated naphthalene sulfonic acid employed should be sufficient so that a final dry a specific gravity of about .03 can be produced. The crude product that is used should be of such acidity that the foam hardens after about 15 minutes. Other suitable foaming agents may be used.

The acid solution of butylated naphthalene sulfonic acid is first whipped into a foam, and then 340 parts of a 25% formaldehyde-urea solution prepared as described above are added, together with 15 parts of wood flour and 5 parts of plaster of Paris. This proportion of plaster of Paris gives the maximum stabilization of the foam, and additional plaster of Paris acts merely as a filler. Additional modifiers may be added, as in any formaldehyde-urea composition.

The mass is whipped to a specific gravity of the proper value and then extruded under a suitable pressure through a slot or die to form a continuous sheet of insulation. The extruded sheet is received upon a traveling belt, and carried through a dryer which dries it first at a low temperature and then at an elevated temperature. The resulting continuous sheet of insulation can be cut into the desired lengths. Each of the lengths is then sprayed with rubber latex. The final product preferably has a specific gravity of about .03.

Various applications of the invention may be devised to meet various requirements.

Having described my invention, I claim:

1. An insulating material of low specific gravity comprising formaldehyde-urea resin foam containing a finely divided calcium sulfate.

2. An insulating material of low specific gravity comprising formaldehyde-urea resin foam containing a finely divided hydrate of calcium sulfate.

3. A method of making an insulating material that includes foaming a slurry comprising a calcium sulfate as a foam-stabilizing agent, and an aqueous solution of a formaldehyde-urea reaction product.

4. A method of making an insulating material that includes foaming a slurry comprising a hydrate of calcium sulfate and an aqueous solution of a formaldehyde-urea reaction product.

5. A method of making an insulating material that includes foaming a slurry comprising a hardening agent, a foaming agent, a hydrate of calcium sulfate as a foam-stabilizing agent, and an aqueous solution of a formaldehyde-urea reaction product.

LEONARD S. MEYER.